United States Patent
Ong

[19]

[11] Patent Number: 5,876,143
[45] Date of Patent: Mar. 2, 1999

[54] DOCUMENT BINDER WITH COVER POCKET FOR CUSTOM TITLE SHEET

[76] Inventor: Bon S. Ong, P.O. Box 4247, Torrance, Calif. 90510

[21] Appl. No.: 760,608

[22] Filed: Dec. 4, 1996

[51] Int. Cl.⁶ .............................. B42F 13/00; B42C 7/00
[52] U.S. Cl. ................................ 402/3; 402/70; 402/73; 402/502; 402/80 R; 281/29; 281/31; 412/3; 412/17
[58] Field of Search ................... 281/31, 29, 38, 281/36, 15.1, 37, 21.1; 402/79, 80 R, 3, 4, 73–77, 502, 70; 412/3, 17

[56] References Cited

U.S. PATENT DOCUMENTS

| | | |
|---|---|---|
| D. 313,619 | 1/1991 | Moor . |
| D. 350,983 | 9/1994 | Penniman ................................. D19/26 |
| 1,965,679 | 7/1934 | Welliver et al. ............................ 402/3 |
| 2,639,168 | 5/1953 | Coppock . |
| 3,092,400 | 6/1963 | Smith . |
| 3,870,223 | 3/1975 | Wyant . |
| 4,294,469 | 10/1981 | Errichiello ............................... 281/29 |
| 4,315,642 | 2/1982 | Errichiello ................................. 402/3 |
| 4,629,349 | 12/1986 | Pitts ....................................... 402/74 |
| 4,630,843 | 12/1986 | Willat ...................................... 281/31 |
| 4,828,421 | 5/1989 | Arakaki ..................................... 402/3 |
| 4,848,798 | 7/1989 | Moor ....................................... 281/31 |
| 4,856,817 | 8/1989 | Moor . |
| 4,892,333 | 1/1990 | Krulich ................................. 281/15.1 |
| 5,002,311 | 3/1991 | Brunjes ................................... 283/79 |
| 5,020,828 | 6/1991 | Moor ....................................... 281/29 |
| 5,030,027 | 7/1991 | Bachrach et al. .......................... 402/4 |
| 5,213,368 | 5/1993 | Wyant ..................................... 281/29 |
| 5,222,825 | 6/1993 | Wyant . |
| 5,620,207 | 4/1997 | Podosek et al. .......................... 281/29 |
| 5,660,514 | 8/1997 | Wilson ...................................... 412/3 |
| 5,683,111 | 11/1997 | Bass et al. ............................. 281/21.1 |
| 5,711,627 | 1/1998 | Chapman ................................... 402/3 |
| 5,720,564 | 2/1998 | Winzen ..................................... 402/3 |

*Primary Examiner*—Frances Han
*Attorney, Agent, or Firm*—Charles H. Thomas

[57] ABSTRACT

A document binder is formed with front and back covers hinged together in articulated fashion with a spine located therebetween. An overlay is provided across the outer surface of at least the front cover and the spine and is secured by fusion to inner and outer, plastic cover sheets that encapsulate a flat, stiff, front cover core, spine, and back cover core therebetween. A front cover title sheet pocket is defined between the overlay and the outer, plastic cover sheet. The title sheet pocket is of a narrow enough width to readily accommodate title sheets printed on paper of standard width, such as eight and a half inches. The fabrication technique employed allows a title sheet pocket to be created for the front cover of the document binder which snugly confines the title sheet and prevents it from shifting laterally as occurs in conventional devices. The creation of title sheet pockets with this configuration is possible according to the method of the invention by first fusing together the overlay to the outer plastic cover sheet along a band of attachment near the demarcation between the front cover and the spine, and then fusing the overlay, outer cover sheet, and inner cover sheet together so as to encapsulate the nonfusible, flat, stiff core elements between the two cover sheets. An inside pocket sheet may also be fused to the inner cover sheet during the same step of fusion so as to form pockets on the insides of the front and back covers.

18 Claims, 11 Drawing Sheets

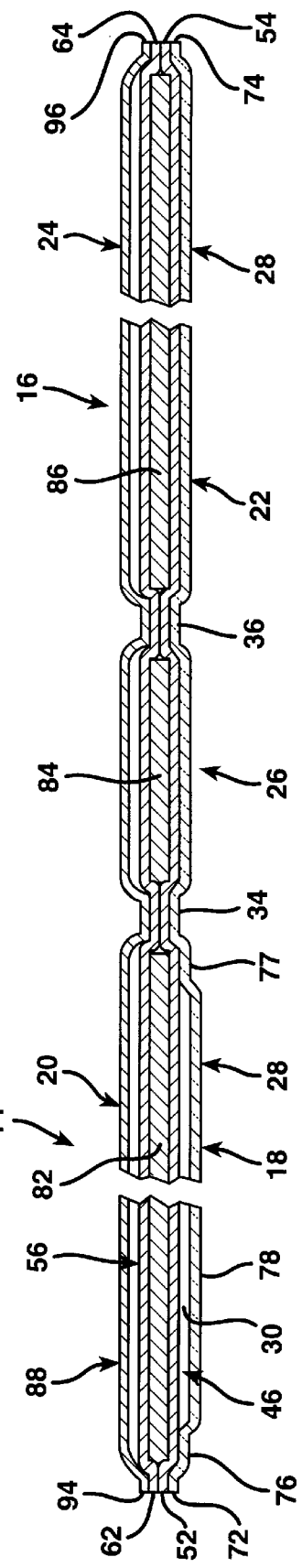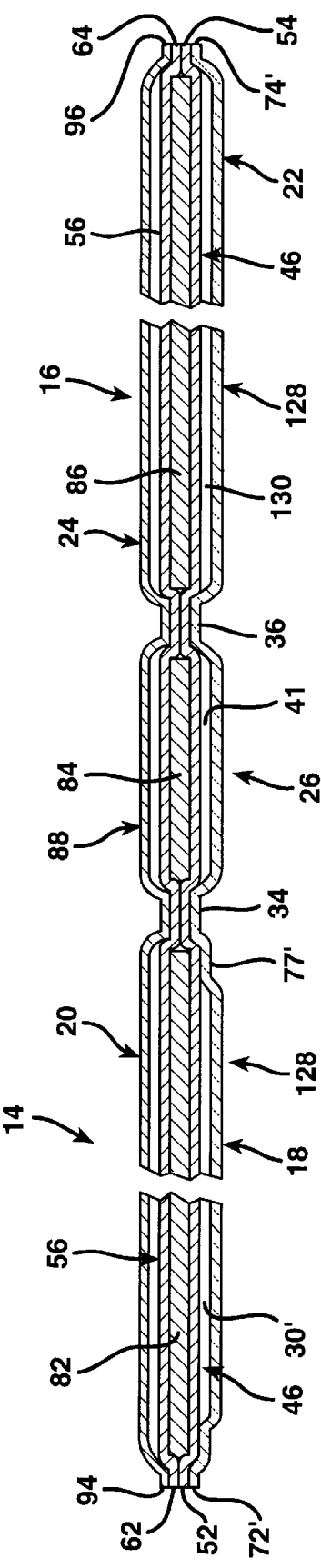

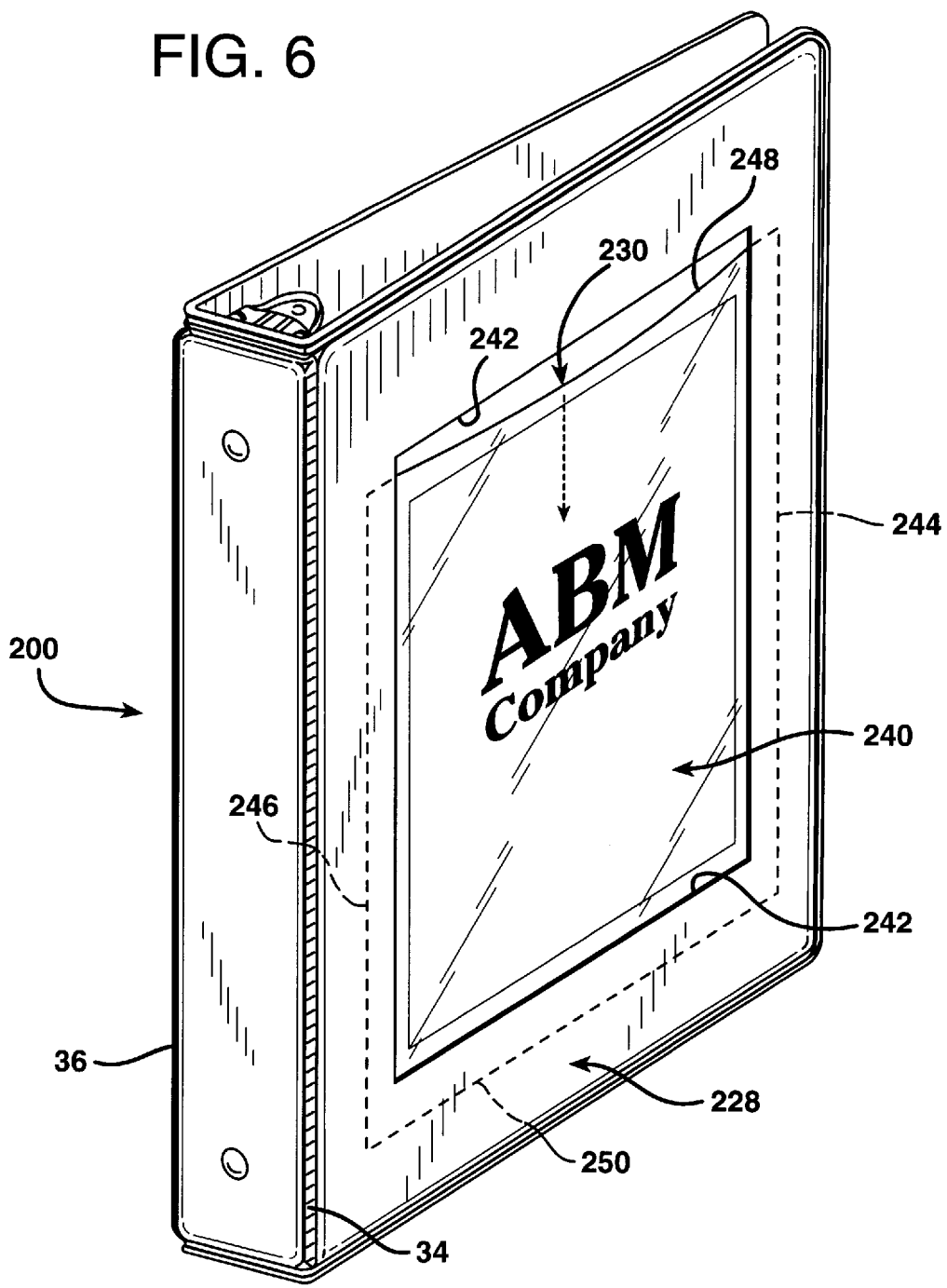

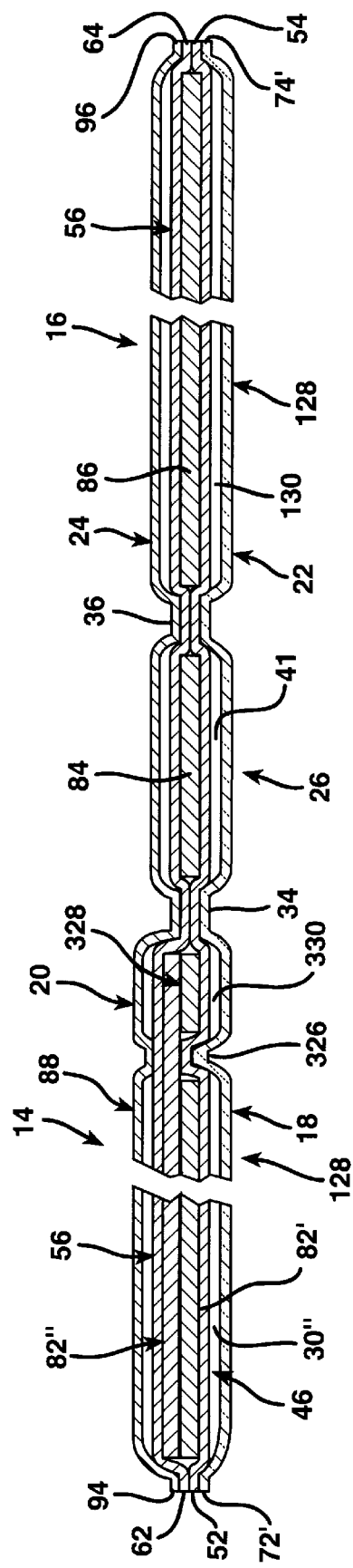

DOCUMENT BINDER WITH COVER POCKET FOR CUSTOM TITLE SHEET

SPECIFICATION

Background of the Invention

1. Field of the Invention

The present invention relates to document binders, such as ring binders, folders, and the like which provide the user with a means for displaying a customized title sheet.

2. Description of the Prior Art

At present documents are often organized in binders in which papers are fastened to a spine in various way. A number of different fastening systems are employed to secure documents to the spine of a binder between front and back covers. For example, comb binders, compression clamp binders, prong fastening binders and other types of document binders are utilized in business, in commerce, and in the field of education. Also, ring binders, and in particular three-ring binders, are utilized extensively for such applications.

Conventional document binders are constructed with a front cover, a back cover, and often a spine in between. In a conventional construction the front and back covers of a binder are typically formed of flat, expansive panels, while the spine between the panels is usually of a much narrower width. Originally ring binders of this type were formed with stiff paperboard cores encapsulated within sheets of heavy paper stock. At present, however, the front and back covers and the spines of conventional ring binders usually employ cores for the covers and the spine therebetween fabricated of chipboard. These cores are typically encapsulated between inner and outer sheets of plastic that are fused together about their peripheral edges and at the demarcations between the cover cores and the spine core. The spine of such a binder is thereby joined to the covers in articulated fashion by hinges formed of longitudinal fusion lines on either side of the spine where the materials of the inner and outer plastic cover sheets are joined together.

While general purpose binders of this type are sometimes suitable, it is often advantageous for the front cover of a binder to be customized with a document title or a title indicative of the entity to which the binder belongs. The nature of the plastic covering on conventional binders is such that imprinting a customized title directly on the cover sheet is normally impractical. The cover is too thick to pass through any type of printing device normally found in an office environment. Moreover, the rings or other fasteners at the spine of the binder would prevent printing in this manner in any event. The expense of printing a customized title on the cover during manufacture for only a limited number of binders cannot be justified economically.

One attempted solution to allow customization of titles for binders has been to provide a binder with a transparent overlay, typically formed of clear plastic. The overlay is normally of a size equal or nearly equal to the size of the cover sheets encapsulating the stiff core elements so that the overlay can be used to envelope the plastic cover sheets when the cover sheets are fused to each other to encapsulate the core elements therewithin. As a consequence, the front cover and spine, and even the back cover of a document binder are provided with pockets on their outer surfaces which can receive printed sheets or strips of paper therewithin. Thus, a title sheet of paper can be printed with appropriate material using a conventional office laser printer, or any other common printing device. A title sheet thus printed can then be inserted into the pocket defined between the transparent overlay and the outer plastic sheet forming the outer surface of the front cover.

One difficulty with conventional document binders employing title sheet pockets of this type is that the pocket for the title sheet is invariably much wider than the title sheet itself. As a consequence, the title sheet is quite likely to slide laterally within the pocket and even assume a cocked position within the pocket. This is visually displeasing to the observer and also creates a tendency for the title sheet to slide out of the pocket, since the mouth of the pocket is considerably wider than the title sheet.

The reason that title sheet pockets on conventional document binders are invariable too wide for the title sheets they are designed to accommodate is due to certain limitations in the process for manufacturing binders and due to certain physical constraints concerning the binders. Specifically, in this country the vast majority of papers organized in ring binders and other types of binders are eight and one-half inches in width. In many other countries A4 size paper, having a width of twenty one centimeters (eight and one quarter inches) is the standard. Standard, accepted widths such as these are employed both for papers to be bound in binders, and for paper that is passed through printers, such as computer controlled laser printers.

As a result of the standardization of paper width, the covers of binders must be significantly wider than the standardized paper width utilized. A certain portion of the width of a binder is occupied by the paper fastening mechanism. In the case of a ring binder the rings typically extend at least about one inch from the inner edges of the covers where the covers meet the spine. Holes are punched in the papers to be bound approximately three-eighths of an inch in from the inside of the paper edge. While this offsets somewhat the space occupied by the binder rings, an additional width of the binder covers beyond the width of the papers to be bound therein of at least about five-eighths of an inch is required due to the space occupied by the rings.

Also, space must be left within the binder at the outside edges of the pages bound therein to accommodate oversized separate sheets and laterally-projecting index tabs which are very often utilized within binders. This requires a further width of the covers of at least about three-quarters of an inch. Therefore, in this country at the very minimum the binder covers must be about one and three-eighths inches wider than the standard eight and a half inch width of the papers to be bound therein. That is, binders for organizing papers of a standard width in this country must have a cover width of at least about nine inches. More typically, however, to ensure complete enclosure of the papers to be bound between the covers, binders are manufactured commercially having covers in a width of between ten and twelve inches. The cover width is measured as the distance from the outside cover edge to the inside edge of the cover where the cover is delineated from the spine.

In order to manufacture a binder having an overlay forming a title sheet pocket with the front cover, it would be convenient to seal the overlay to the fusible front cover sheet of material not only at the delineation between the covers and the spine, but also lengthwise along a band of sealing spaced from the delineation between the front cover and the spine a sufficient distance so as to create a pocket that is no greater than about nine inches in width, and preferably about eight and three-quarter inches in width, between the band of sealing and the opposite free edge of the front cover. However, this has not heretofore been possible on a commercially feasible basis since the band of attachment between the overlay and the outer front cover sheet lies in registration atop the stiff, front cover core. The material of choice employed to fabricate the core panels in document binders enjoying the most widespread commercial use is a substance known as chipboard. While chipboard provides a suitable stiff quality to the document binder cover and is quite economical, it cannot be fusibly joined to the plastic cover material and the plastic overly employed in the fabrication of conventional document binders.

While a core material that is fusible to the plastic cover and overlay material could be substituted for the chipboard covers now employed, the increased costs of such a fusible substitute material would make document binders fabricated in this way prohibitively expensive and therefore commercially unattractive.

SUMMARY OF THE INVENTION

The present invention provides a document binder fabricated in such a way as to allow a plastic overlay to be secured to an outer cover material sheet along a band of attachment laterally displaced from the inner edge of the flat front cover core, and in fact directly atop the flat front cover core without requiring a fusible seal between the front cover core and the outer covering sheet at that location. As a consequence, the invention allows a document binder to be produced with a front cover title sheet pocket that snugly accommodates a title sheet printed on paper of standard width at an economically competitive cost.

A further object of the invention is to provide a document binder which can be assembled rapidly and economically from inexpensive materials, and which provides an improved front cover title sheet pocket. The pocket for the front cover title sheet is configured to snugly and securely accommodate a title sheet printed on paper of standard size and which requires only the print capability of equipment found in most modern offices and commercial establishments.

In one broad aspect the present invention may be considered to be a document binder comprising front and back covers both having a length and width and inner and outer faces. The front and back covers both have perimeters of expansive, rectangular configuration. The binder also includes a spine having inner and outer faces interposed between and hinged lengthwise in articulated fashion to both the front and back covers. The spine has a perimeter shaped as an elongated, rectangular strip that is narrower than the front and back covers. A rectangular overlay is secured to at least a portion of the perimeter of the front cover and to the outer face of the front cover and extends across the entire width of the outer face of the front cover to define a title sheet pocket with an unsealed mouth. The title sheet pocket has a width of no greater than about nine inches. A title sheet is located within the title sheet pocket and is laterally confined snugly therewithin and is visible through the overlay.

In another broad aspect the invention may be considered to be a method of manufacturing a document binder. The method involves forming a fusible rectangular overlay, an outer, fusible, rectangular sheet of material, and an inner, fusible, rectangular sheet of material, all with mutually parallel top edges, bottom edges, and laterally-spaced front and back cover side edges. The lengths of the outer and inner fusible sheets of material are the same as are their widths. The width of the overlay is the same as that of the inner and outer fusible sheets of material and the length of the overlay is no greater than that of the inner and outer fusible sheets of material.

In the assembly steps the rectangular overlay is positioned atop the outer, fusible, rectangular sheet of material so that at least the side edges and the bottom edge of the overlay are respectively congruent to the side edges and the bottom edge of the outer sheet of material. That is, the side edges and the bottom edge of the overlay are superimposed upon and lie directly above the corresponding side edges and bottom edge of the outer sheet of material. The overlay is fused to the outer, rectangular sheet along a band of attachment that is parallel to the side edges and is laterally spaced from the front cover side edges of both the overlay and the outer sheet.

The outer fusible sheet with the overlay is positioned atop the inner fusible sheet in congruent relationship relative thereto and with the overlay in at least partially congruent relationship thereto. Flat, nonfusible front and back cover cores and a spine cover core are positioned between the inner and outer fusible sheets such that the front cover core is disposed between the front cover side edges. The spine core is located laterally adjacent to the front cover core in spaced separation therefrom. The back cover core is located laterally adjacent to the spine core in spaced separation therefrom. All of the cores are positioned to reside within a area bounded by the top and bottom edges and the front and back cover side edges of the inner and outer fusible sheets.

The fusible overlay and the outer and inner fusible sheets are then fused together at their edges which are mutually congruent and on both sides of the spine core. This procedure encapsulates the cores between the outer and inner sheets and forms a document binder having front and back covers with a spine locate therebetween and with a title sheet pocket formed on the outside of the front cover. The title sheet pocket has an unsealed mouth between the linear band of attachment and the front cover side edges of the overlay and the outer sheet and is no greater than about nine inches in width.

In still another broad aspect the invention may be considered to be a method of manufacturing a document binder comprising forming inner and outer fusible rectangular cover sheets with top edges, bottom edges, front cover side edges, and back cover side edges so that the lengths of the side edges of each of the cover sheets are equal to each other and so that the widths of the top and bottom edges of each of the cover sheets are equal to each other. A rectangular, fusible overlay is formed with a top edge, a bottom edge, a front cover side edge, and a back cover side edge. The top and bottom edges of the overlay have the same width as the top and bottom edges of the cover sheets. The side edges of the overlay have a length no greater than the length of the side edges of the cover sheets.

The overlay is positioned atop the outer cover sheet so that at least the bottom edges and the side edges thereof are aligned in mutually congruent relationship. The overlay is fused to the outer cover sheet lengthwise along a band of attachment located between and parallel to the side edges thereof.

Flat, nonfusible, rectangular front and back cover cores are formed. A relatively narrow, nonfusible, rectangular spine cover core is also formed. The nonfusible cover cores are formed in sizes such that the lengths of each of the nonfusible cores are equal to each other and are less than the lengths of the cover sheets. The aggregate sum of the widths of the nonfusible cover cores is less than the width of the fusible cover sheets. The nonfusible cores are positioned side-by-side in spaced separation from each other atop the inner cover sheet with the nonfusible spine core located between the front and back cover cores so that all of the nonfusible cores reside within the perimeter of the inner cover sheet.

The outer cover sheet with the overlay fused thereto is positioned atop the nonfusible cores and the inner cover sheet so that all of the edges of the inner and outer cover sheets are mutually congruent to each other and so that least the bottom and side edges of the overlay are congruent to the bottom and side edges of the cover sheet. The overlay and the inner and outer cover sheets are then fused together about all congruent edges thereof and also lengthwise on both sides of the nonfusible spine core. As a result, the nonfusible cores are encapsulated between the inner and outer cover sheets in isolation from each other.

The invention may be described with greater clarity and particularity by reference to the accompanying drawings.

DESCRIPTION OF THE DRAWINGS

FIG. 3A is a sectional elevational view taken along the lines 3A—3A of FIG. 2 with the title sheet omitted therefrom.

FIG. 5A is a sectional view of the document binder of FIG. 4 comparable to the view shown in FIG. 3A.

FIG. 6 is a perspective view of another alternative embodiment of a document binder constructed according to the invention.

FIG. 9A is a sectional view of the document binder of FIG. 8 comparable to the view shown in FIG. 3A.

DESCRIPTION OF THE EMBODIMENTS AND IMPLEMENTATION OF THE METHOD

Figure 1:
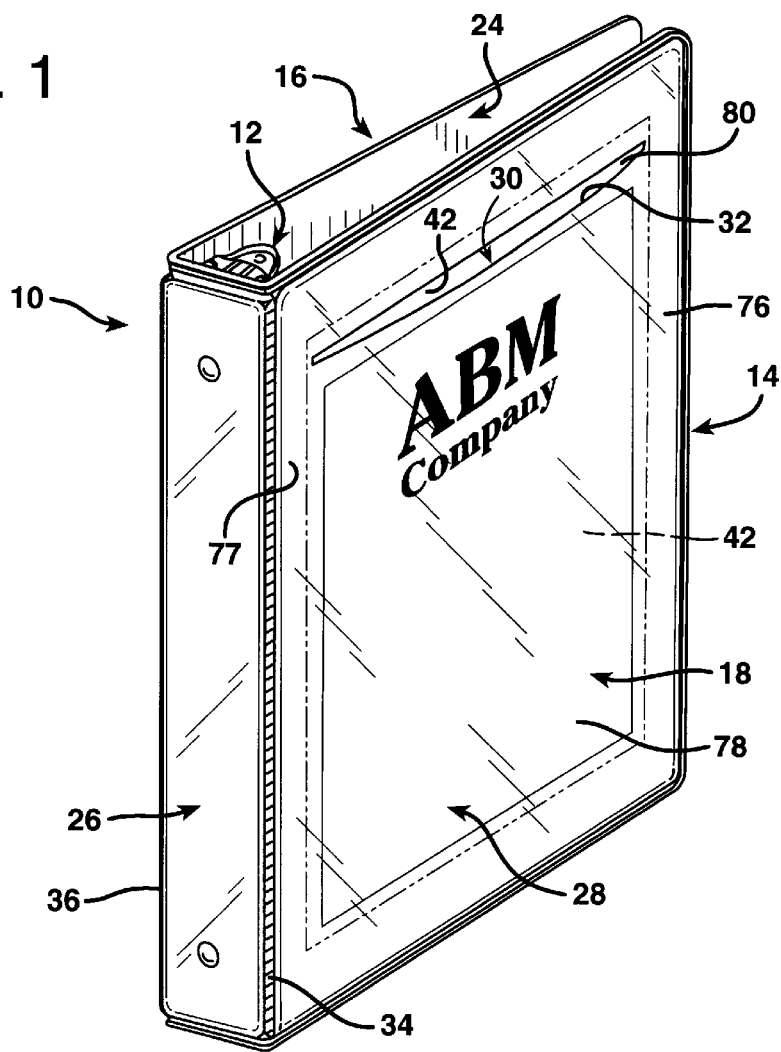
FIG. 1 is a perspective view of one preferred embodiment of a document binder constructed according to the invention.

FIG. 1 illustrates a document binder 10 which is a three-ring binder for accommodating papers punched with three holes spaced apart from each other a distance of four and one-quarter inches and in from the left marginal edges of the sheets of paper a distance of approximately three-eighths of an inch. The ring binding mechanism is indicated at 12 in FIG. 2.

The document binder 10 is comprised of a front cover 14 and a back cover 16. The front and back covers 14 and 16 are equal in length or height, which is measured parallel to the alignment of the ring binding mechanism 12. Typically, the front and back covers 14 and 16 are each eleven and three-quarter inches high. The front and back covers 14 and 16 are also equal in width, both being between about nine and three-quarters inches and fifteen inches wide as measured along the upper and lower edges thereof perpendicular to the alignment of the ring binding mechanism 12. The front and back covers 14 and 16 both have perimeters of a rectangular configuration, the corners of which are rounded slightly for safety reasons. The front cover 14 has an outer, front face 18 and an inner face 20. Likewise, the back cover 16 has an outer, back face 22 and an inner face 24.

A spine 26 is interposed between and hinged lengthwise in articulated fashion to both the front cover 14 and the back cover 16. The spine has a perimeter shaped as a narrow, elongated, rectangular strip, also eleven and three-quarter inches in length or height. The width of the spine 26 varies, depending upon the capacity of the document binder 10, but is narrower than the width of the front and back covers 14 and 16. Document binders 10 are sold commercially in which the spines 26 thereof are typically one-half, one, one and a half, two, two and a half, three, four, and five inches in width. The embodiment of the document binder 10 illustrated in FIGS. 1 and 2 has a spine 26 one and one-quarter inches in width.

The document binder 10 also is provided with a transparent, rectangular overlay 28 that is secured to the front cover 14 about its entire perimeter and also to the marginal portion of the outer face 18 of the front cover 14. The overlay 28 extends across the entire width of the outer face 18 of the front cover 14 to define a title sheet pocket, indicated at 30 in FIGS. 1 and 3A. The pocket 30 has an unsealed mouth 32. The overlay 28 also extends across the entire widths of the spine 26 and the back cover 16. The overlay 28 is secured to the lateral demarcations of the spine 26 at the hinges 34 and 36 where the spine 26 is hinged in articulated fashion to the front and back covers 14 and 16, and also at least along the top and bottom edges of the spine 26 as well. The overlay 28 is also secured to the entire perimeter of the back cover 16, specifically along the bottom edge 37 and the outside back cover side edge 39, and the top edge 35 thereof.

The title sheet pocket 30 on the front cover 14 has a width preferably no greater than about nine inches and no less than about eight and five-eighths inches. As illustrated in FIG. 1 the title sheet pocket 30 laterally confines the title sheet 42 snugly therewithin. The title sheet 42 is visible through the transparent overlay 28.

Figure 3:
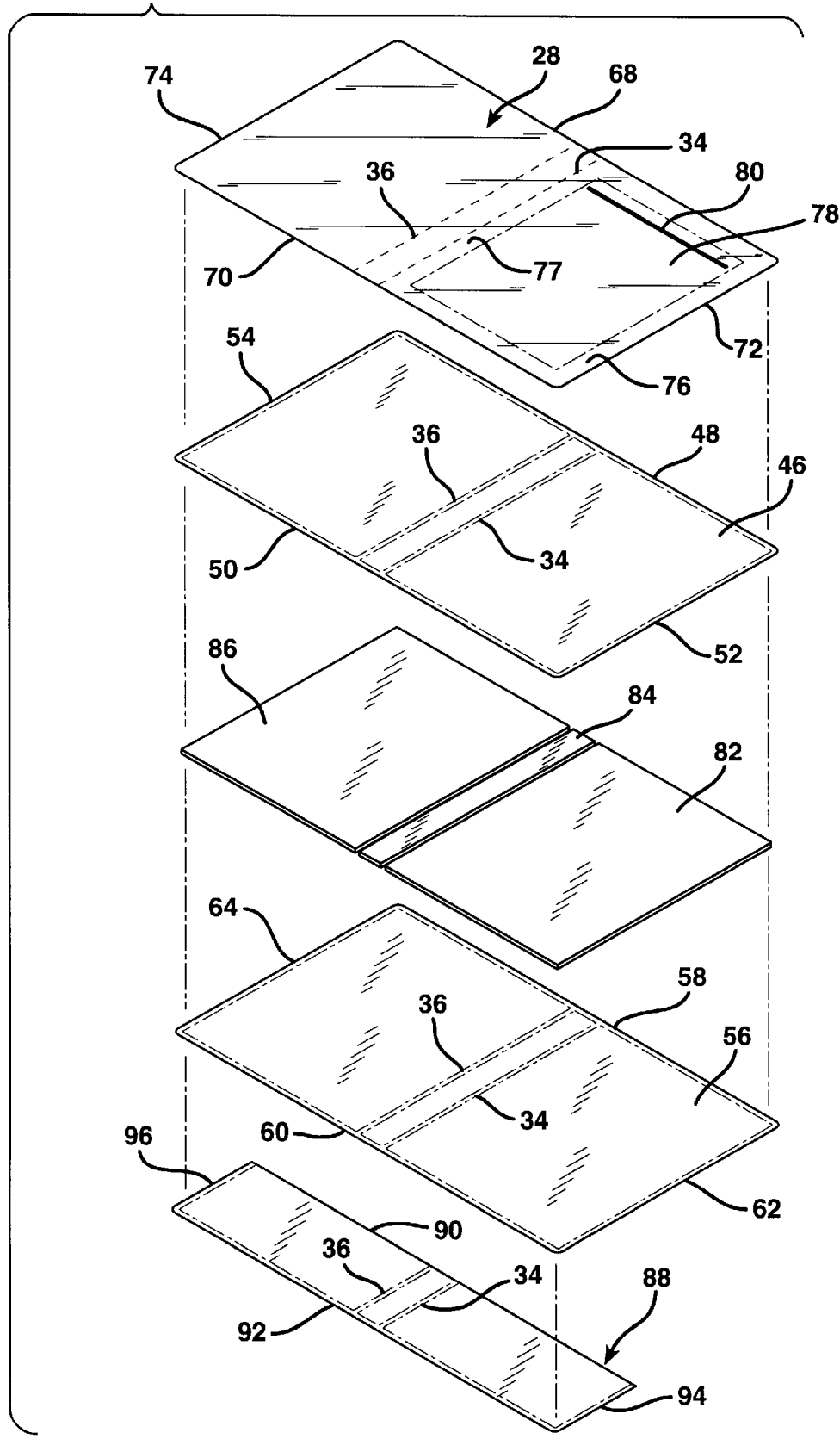
FIG. 3 is an exploded perspective view illustrating the method of manufacture of the document binder of FIG. 1.

The method of fabricating the document binder 10 is best depicted in FIG. 3. The front cover 14 is comprised of an outer, fusible, rectangular front cover sheet 46, formed of a suitable fusible plastic, such as opaque polypropylene. The outer cover sheet 46 has a top edge 48 and a bottom edge 50 which are mutually parallel to each other and a front side edge 52 and a back side edge 54 which are laterally spaced apart and also are mutually parallel to each other. An inner cover sheet 56 is employed and likewise has a top edge 58 and a bottom edge 60 parallel to the top edge 58. The inner cover sheet 56 also has a front cover side edge 62 and a back cover side edge 64. The front and back cover side edges 62 and 64 are laterally spaced apart and are mutually parallel relative to each other. The inner cover sheet 56 is also formed of opaque polypropylene.

The lengths of the outer and inner cover sheets 46 and 56, as respectively measured between the top and bottom edges 48 and 50 of the outer cover sheet 46 and the top and bottom edges 58 and 60 of the inner cover sheet 56 are the same, typically about eleven and three-quarter inches. Likewise, the widths of the outer cover sheet 46 and the inner cover sheet 56 are the same. The width of the outer cover sheet 46 is measured between the cover side edges 52 and 54 while the width of the inner cover sheet 56 is measured between the cover side edges 62 and 64. When the spine 26 is one and one-quarter inches in width, the widths of the front cover sheet 46 and the back cover sheet 56 are each about twenty-two and one-quarter inches.

The transparent overlay 28 employed in the fabrication of the document binder 10 is also of rectangular configuration. The transparent overlay 28 is formed of clear, transparent vinyl or polypropylene plastic and has a top edge 68, a bottom edge 70, a front cover side edge 72, and back cover side edge 74. In the embodiment of the document binder according to the invention depicted in FIGS. 1–3A, the transparent overlay 28 has dimensions identical to those of the outer cover sheet 46 and also the inner cover sheet 56. As a consequence, the length of the transparent overlay 28, as measured between the top and bottom edges 68 and 70 thereof, is the same as the lengths of the top and bottom cover sheets 46 and 56. Also, the width of the transparent overlay 28 as measured between the cover side edges 72 and 74 is equal to the width of the top and bottom cover sheets 46 and 56.

For reasons that will hereinafter become apparent, the portion of the transparent overlay 28 that is ultimately secured to the front cover 14 of the document binder 10 may be considered to be comprised of a marginal, rectangular border 76 located within the top and bottom edges 68 and 70 and between the side edges 72 and 74. This marginal border, for example, may have a width of one-quarter of an inch as measured in from the top edge 68 and also from the bottom edge 70 and a width of three-quarters of an inch as measured in from the front cover side edge 72 and from the spine demarcation 34. The area 78 of the transparent overlay 28 encompassed within the marginal, rectangular border 76 thereby has a length of eleven and one-quarter inches and a width of eight and three-quarter inches.

Prior to the assembly steps, and actually in the fabrication of the transparent overlay 28, a laterally-extending slit 80 is die cut into the transparent overlay 28 across the width of the area 78 thereof one-half of an inch in from the top edge 68. The slit 80 extends across the entire width of the area 78 that is surrounded by the rectangular border 76 prior to fusing the overlay 28 to the outer fusible cover sheet 46.

The overlay 28 is then positioned atop the outer cover sheet 46 so that the edges 68, 70, 72, and 74 thereof all reside in mutually congruent and coterminous relationship with the corresponding edges 48, 50, 52, and 54 of the outer fusible cover sheet 46. The transparent overlay 28 is thereupon sealed to the outer plastic sheet 46 throughout the marginal, rectangular border 76, which includes that portion 77 of the overlay 28 immediately adjacent to the spine demarcation 34 that serves as a band of attachment parallel to the side edges 72 and 74 of the overlay 28. Fusion is typically performed by heat sealing, although fusion by means of sonic welding or even a solvent adhesive may be employed as well.

Once the marginal, rectangular border 76 of the overlay 28 has been sealed to the area of the outer fusible cover sheet 46 located immediately therebeneath, the area 78 of the overlay 28 is delineated and defined as an unsealed area of the overlay 28, surrounded by the sealed, marginal, rectangular border 76. The unsealed area 78 thereby defines the title sheet pocket 30 while the slit 80 formed in the transparent overlay 28 across the title sheet pocket 30 defines the unsealed mouth 32 thereof.

The fusible, outer cover sheet 46, with the overlay 28 fused thereto at the marginal, rectangular border 76, is then positioned atop the inner, fusible sheet 56 in congruent relationship relative thereto. In the embodiment of FIGS. 1–3A, the overlay 28 also is completely congruent relative to the outer cover sheet 46 and the inner cover sheet 56 as well.

A flat, expansive, nonfusible, rectangular front cover core 82, a flat, narrow, nonfusible, spine cover core 84, and a flat, expansive, nonfusible, rectangular back cover core 86 are then positioned between the inner fusible sheet 56 and the outer fusible sheet 46. The sizes of the nonfusible cores 82, 84, and 86 are such that the lengths of each of the nonfusible cores 82, 84, and 86 are equal to each other and are less than the lengths of the fusible cover sheets 46 and 56. The aggregate sum of the widths of the nonfusible cover cores 82, 84, and 86 is less than the widths of the fusible cover sheets 46 and 56.

The cover cores 82, 84, and 86 are all preferably formed of chipboard and are positioned side-by-side in spaced separation from each other atop the inner cover sheet 56, as illustrated in FIG. 3. The nonfusible spine core 84 is located between the front cover core 82 and the back cover core 86 such that all of the nonfusible cores 82, 84, and 86 reside within the perimeter of the inner cover sheet 56. All of the flat, nonfusible cores 82, 84, and 86 reside within an area bounded by the top edges 48,58, the bottom edges 50,60, the front cover side edges 52,62, and the back cover side edges 54,64 of the outer fusible sheet 46 and the inner fusible sheet 56, respectively. The front cover core 82 is disposed between the front cover edges 52, 62, and 72 of the overlay 28 and the cover sheets 46 and 56 and the spine demarcation 34 in all of those sheets.

In the embodiment of the invention depicted in FIGS. 1–3A, a rectangular, fusible, inside pocket sheet 88 is also employed. The pocket sheet 88 has an area smaller than that of the inner, fusible, rectangular sheet 56 and is provided with a top edge 90, a bottom edge 92, a front cover side edge 94, and a back cover side edge 96. The bottom edge 92 of the inside pocket sheet 88 is congruent to and coterminous with the bottom edge 60 of the inside cover sheet 56. The front cover side edge 94 of the inside pocket sheet 88 is congruent to the front cover side edge 62 of the inside cover sheet 56, and the back cover side edge 96 of the inside pocket sheet 88 is congruent to the back cover side edge 64 of the inside cover sheet 56. Three of the edges of the inside pocket sheet 88 are thereby congruent with three corresponding edges of the inner fusible sheet 56.

With all of the layers in position as depicted in FIG. 3A, all of the mutually congruent edges of the overlay 28, the outer cover sheet 46, the inner cover sheet 56 and the inside pocket sheet 88 are then fused together. That is, as best illustrated in FIG. 3A, the front cover side edges 72, 52, 62, and 94 are all fused together. Likewise, the back cover side edges 74, 54, 64, and 96 are all fused together. The congruent bottom edges 70, 50, 60 and 92 are all fused together as well. Similarly, the top edges 68, 48, and 58 are fused together. Since the top edge 90 of the inside pocket sheet 88 is not congruent to the other top edges 68, 48, and 58, it is left unsealed.

Concurrently with fusion of the mutually congruent edges of the overlay 28, the front cover sheet 46, the back cover sheet 56, and the inside pocket sheet 88, the overlay 28, the inside cover sheet 46, outside cover sheet 56 and the inside pocket sheet 88 are concurrently fused together along the spine demarcations 34 and 36 shown in each of those sheets on both sides of the spine core 84. As a result, the nonfusible chipboard cores 82, 84, and 86 are encapsulated between the fusible outer sheet 46 and the fusible inner sheet 56, as depicted in FIG. 3A, so as to form the document binder 10 depicted in FIGS. 1 and 2.

With reference to FIG. 1, it can be seen that the pocket 30 defined at the front cover 14 of the document binder 10 is narrower than front cover sheet pockets formed in conventional document binders. Specifically, the width of the pocket 30 is no greater than about nine inches, and in the embodiment depicted and described is actually eight and three-quarter inches as measured across the slit 80 that extends the width of the unsealed area 78 of the overlay 28. The slit 80 defines the unsealed pocket mouth 32.

As is evident, a printed title sheet of paper 42 can be inserted into the unsealed mouth 32 of the pocket 30 through the gap created by the slit 80 between the unsealed area 78 of the overlay 28 and the outwardly facing surface of the outer cover sheet 46 located adjacent thereto. Since the width of the pocket 30 is only eight and three-quarter inches, a conventional eight and a half by eleven inch sheet of paper 42 is confined laterally snugly within the pocket 30.

Figure 4:
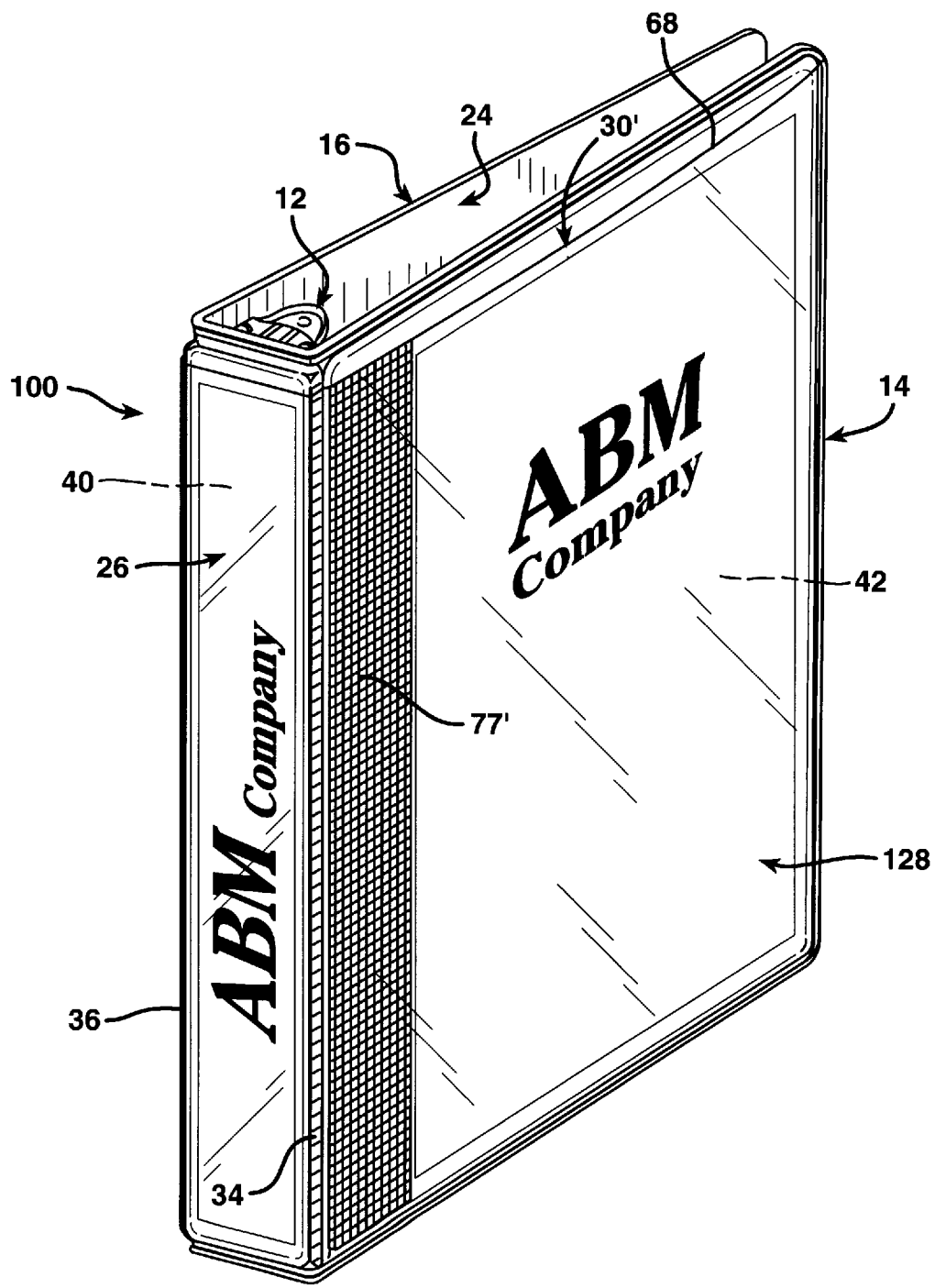
FIG. 4 is a perspective view of one alternative embodiment of a document binder according to the invention.

An alternative embodiment of the invention is depicted in FIGS. 4, 5, 5A, and 5B. FIG. 4 illustrates a document binder 100 which is similar in many respects and which contains many of the same components and elements as the document binder 10. Those components and elements of the document binder 100 which are also found in the document binder 10 bear the same reference numbers.

The principal difference in the document binder 100 from the document binder 10 resides in the structure of the transparent overlay 128. Unlike the overlay 28, there is no rectangular, marginal border area 76 defined on the overlay 128. Like the overlay 28, the overlay 128 is transparent and has a rectangular configuration including a top edge 68 and a bottom edge 70 parallel to the top edge 68. The overlay 128 also includes a front cover side edge 72' and a back cover side edge 74'. The top edge 68 and the bottom edge 70 of the overlay 128 have the same width as the top edges 48,58, and bottom edges 50,60 of the outer fusible cover sheet 46 and inner fusible cover sheet 56, respectively. However, the front and back cover side edges 72' and 74' of the overlay 128 are both equal to each other but one-eighth of an inch shorter than the corresponding side edges 52,62, and 54,64 of the outer cover sheet 46 and inner cover sheet 56, respectively.

In the fabrication of the document binder 100, the overlay 128 is positioned so that the bottom edge 70 of the overlay 128 is coterminous with and congruent to the bottom edge 50 of the outer sheet 46. The side edges 72' and 74' are also congruent to the corresponding side edges 52 and 54 of the outer cover sheet 46, but are slightly shorter than those corresponding edges. The top edge 68 of the overlay 128 therefore is not congruent to the top edge 48 of the outer cover sheet 46, but rather is longitudinally offset therefrom one-eighth of an inch in the direction of the bottom edges 50 and 70.

The overlay 128 is thereupon fused to the outer cover sheet 46 lengthwise along a band of attachment 77' that is parallel to the side edges 72' and 74' of the overlay 128. The band of attachment 77' is preferably about one and one-quarter inches in width for a one inch binder and lies adjacent to the spine demarcation 34 and extends therefrom laterally toward the front cover side edge 72'. The width of the band of attachment 77' will vary, depending upon the ring capacity of the binder. Once the first step of fusion is complete, the overlay 128 is fused to the outer cover sheet 46 lengthwise along the entire band of attachment 77', which is of a uniform width throughout and is parallel to the side edges 72' and 74' of the overlay 128. A waffle-shaped pattern of sealing is employed along the band of attachment 77', as illustrated in FIGS. 4 and 5B. The band of attachment 77' is laterally spaced from the front cover side edges 72' and 52 of the overlay 128 and the outer cover sheet 46, respectively, a distance such that a portion of the overlay 128 nine inches in width is left unsealed between the attachment band 77' and the front cover side edges 72' and 52.

The flat, nonfusible, front cover core 82, the spine cover core 84, and the back cover core 86 are then positioned between the outer and inner fusible sheets 46 and 56. The nonfusible cores 82, 84, and 86 are positioned side by side in spaced separation from each other atop the inner cover sheet 56 with the nonfusible spine core 84 located between the front cover core 82 and the back cover core 86. All of the nonfusible cover cores 82, 84, and 86 reside within the perimeter of the inner cover sheet 56.

The outer cover sheet 46 with the overlay 128 fused thereto is then positioned atop the nonfusible cores 82, 84, and 86 so that all of the edges of the inner cover sheet 56 and the outer cover sheet 46 are mutually congruent to each other and so that the bottom edge 70 and the side edges 72' and 74' of the overlay 128 are also congruent to the corresponding bottom and side edges of the cover sheets 46 and 56 located immediately therebeneath.

Figure 2:
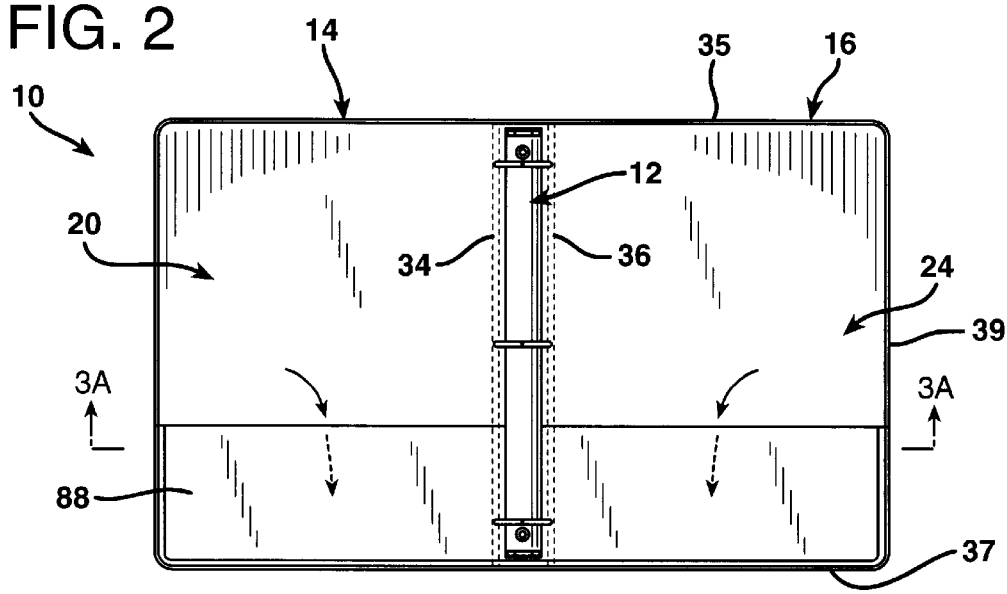
FIG. 2 is an elevational view of the inside of the document binder of FIG. 1.

As in the embodiment of FIGS. 1–3, the document binder 100 employs an inside pocket sheet 88. Consequently, the congruent front cover side edges 72', 52, 62 and 94 are all fused to each other. Likewise, the congruent bottom edges 70, 50, 60, and 92 are all fused to each other. Similarly, the congruent back cover side edges 74', 54, 64, and 96 are all fused to each other. As in the document binder 10, the top edge 90 of the inside pocket sheet 88 is left unsealed so as to form pockets at the inner faces 20 and 24 of the front cover 14 and back cover 16, respectively. It should be noted that since the top edge 68 of the overlay 128 does not reside directly above the corresponding top edges 48 and 58 of the outer and inner cover sheet 46 and 56, it is also left unsealed, although the top edges 48 and 58 of the outer and inner cover sheets 46 and 56 are sealed to each other throughout.

In the document binder 100, the transparent overlay 128 has four edges, namely the edges 68, 70, 72' and 74'. Three of these edges, the edges 72', 70 and 74', are congruent with and fused to the corresponding edges of the inner sheet 56 and the outer sheet 46. The fourth edge of the overlay 128, that is the edge 68, is left unsealed and forms the mouth of the title sheet pocket 30'.

As the congruent outer edges of the structure are sealed together, the overlay 128, the outer sheet 46, the inner sheet 56, and the inside pocket sheet 88 are also fused together lengthwise on both sides of the nonfusible spine core 84 along the lines 34 and 36 delineating the spine 26 of the binder 100.

In the finished structure of the document binder 100, the top edge 68 of the overlay 128 is not sealed to either of the fusible cover sheets 46 or 56. The top edge 68 of the overlay 128 thereby forms the unsealed mouth of the title sheet pocket 30'. The title sheet 42 may thereby be inserted into the pocket 30' by sliding it in between the top edge 68 of the overlay 128 and the outwardly facing surface of the outer cover sheet 46 at the outer face 18 of the binder front cover 14, as illustrated in FIG. 5B. Since the top edge 68 of the overlay 128 is sealed only where it intersects the side cover edges 72' and 74' and the spine demarcations 34 and 36, pockets are also formed at the spine 26 and back cover 22 of the document binder 100. As a consequence, a spine title strip 40 may be inserted into the spine pocket 41 between the top edge 68 of the overlay 128 and the outer surface of the outer sheet 46 between the spine demarcations 34 and 46, also as illustrated in FIG. 5B.

In the document binder 100 a back pocket 130 is also defined between the overlay 128 and the outer cover sheet 46. This back pocket 130 appears in FIG. 5A. Documents may be inserted into the back pocket 130 between the unsealed upper edge 68 of the overlay 128 and the outer surface of the outer sheet 46 between the spine demarcation 36 and the back panel side edge 54.

Figure 5:
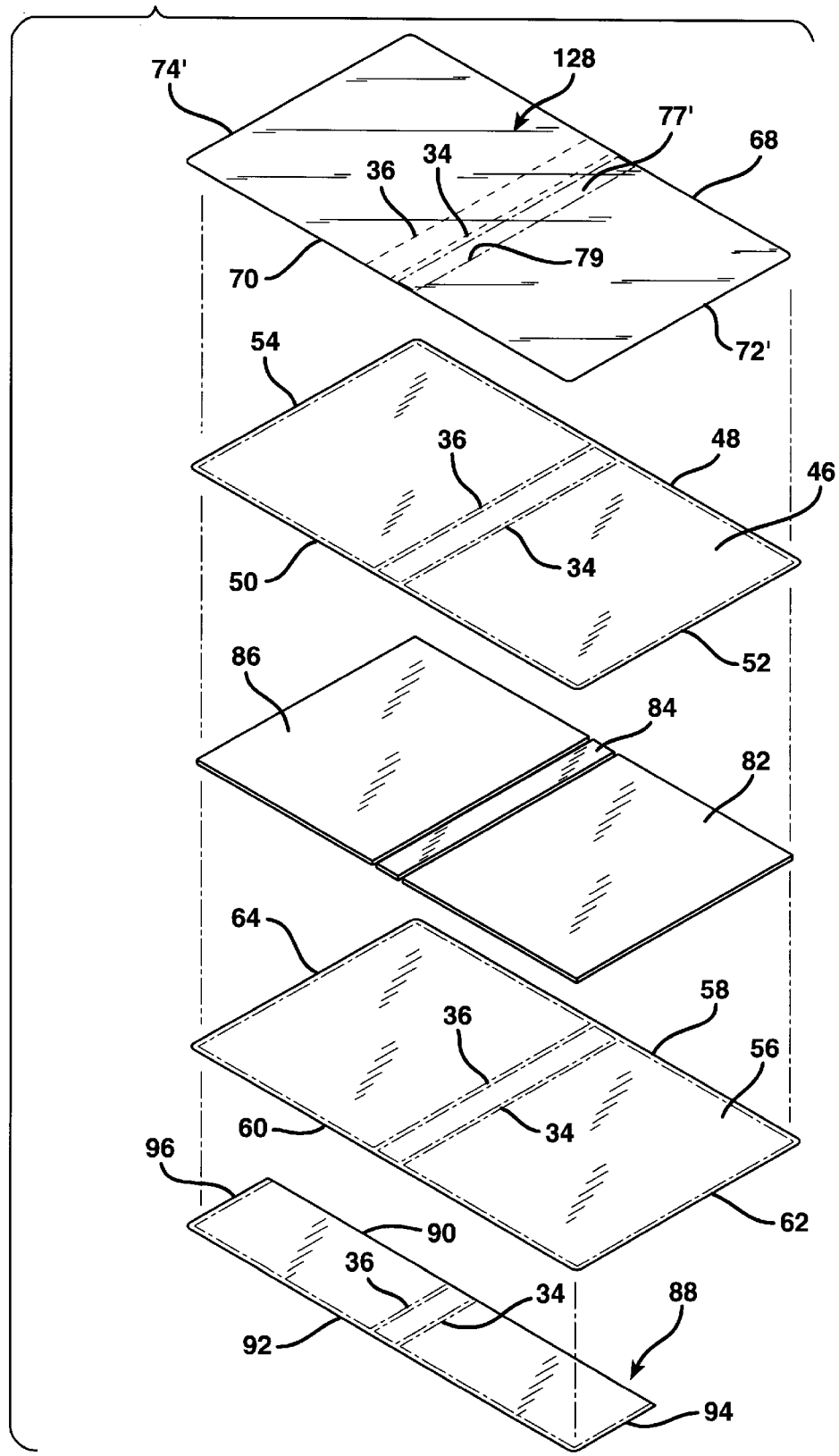
FIG. 5 is an exploded perspective view illustrating the method of fabrication of the document binder of FIG. 4.
Figure 5B:
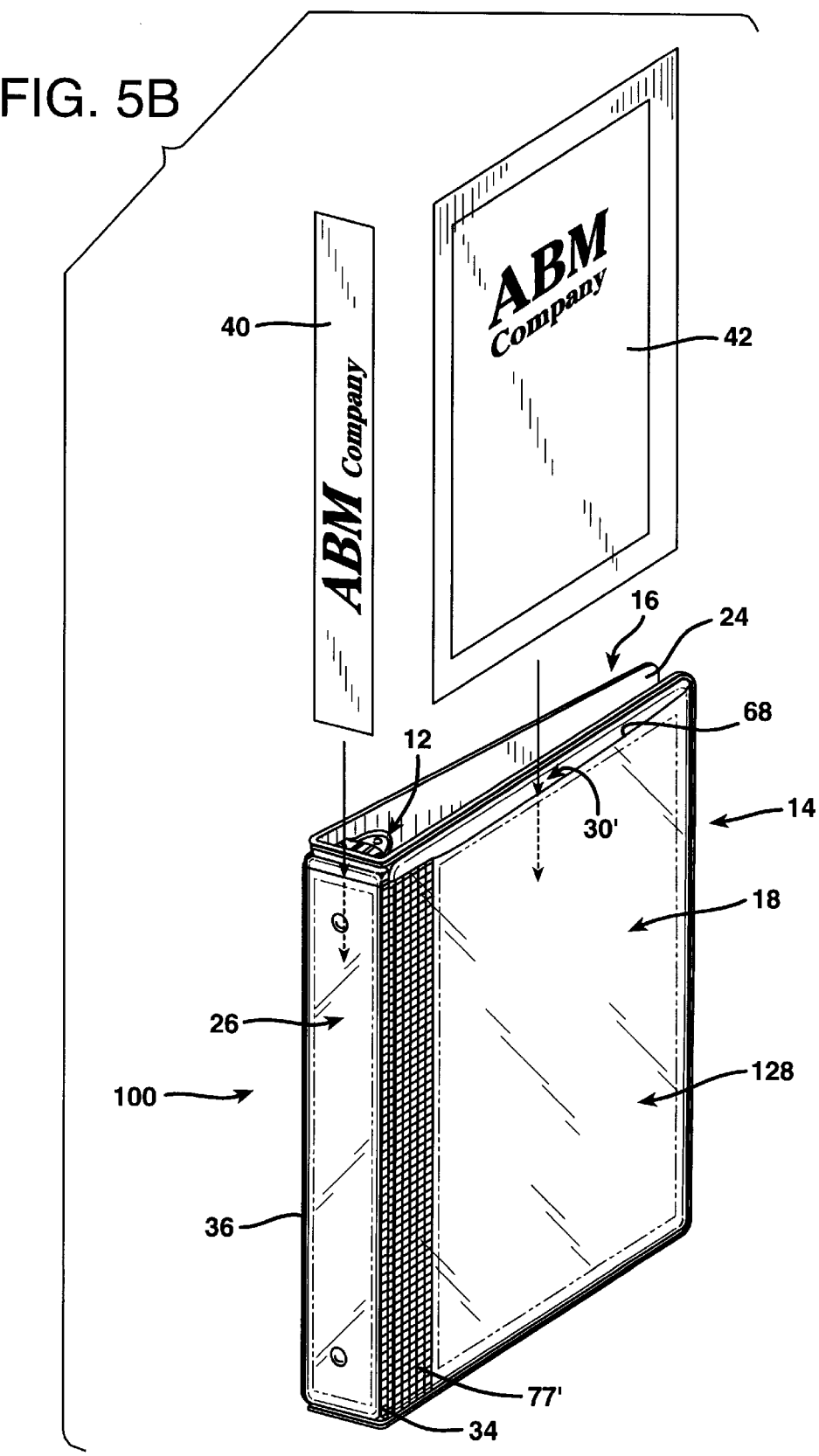
FIG. 5B is a perspective view showing insertion of a title sheet and spine title strip into the document binder of FIG. 4.

Various modifications of the embodiment of FIGS. 4–5B are also possible. For example, in one modified form the transparent overly 128 can be constructed to have the same length, as well as the same width, as the outer cover sheet 46 and inner cover sheet 56. In such an arrangement the transparent overlay is precut with an elongated, longitudinally-extending slit immediately adjacent to the area at which the band of attachment 77' is to be formed. Specifically, this slit can be cut along the line 79 indicated in FIG. 5. The slit along the line 79 is parallel to the overlay side edges, but does not intersect, either the top edge 68 or the bottom edge 70. In this modified form of the invention the transparent overlay 128 is sealed about all of its peripheral edges to the outer and inner cover sheets 46 and 56, and is thus fused to the outer and inner cover sheets 46 and 56 throughout its entire perimeter. However, a title sheet pocket is still formed between the overlay 128 and the outer cover sheet 46 and is accessible through the slit formed along the line 79 immediately adjacent the band of attachment 77'. This title sheet pocket is a side opening pocket with a mouth formed by the slit along the line 79 that accommodates the entire length of the title sheet 42.

To insert or remove a title sheet the portion of the overlay 128 immediately adjacent to the band of sealing 77' is lifted at the slit along the line 79, and the title sheet is inserted laterally passing across the band of attachment 77', through the slit formed along the line 79, and in between the overlay 128 and the outer cover sheet 46. Alternatively, the longitudinal slit may be formed parallel and quite near to the front cover side edge of the transparent overlay 128. In still another modification the front cover side edge of the overlay 128 may be left open and unsealed from the outer cover sheet 46. Other modifications are also possible.

Figure 7:
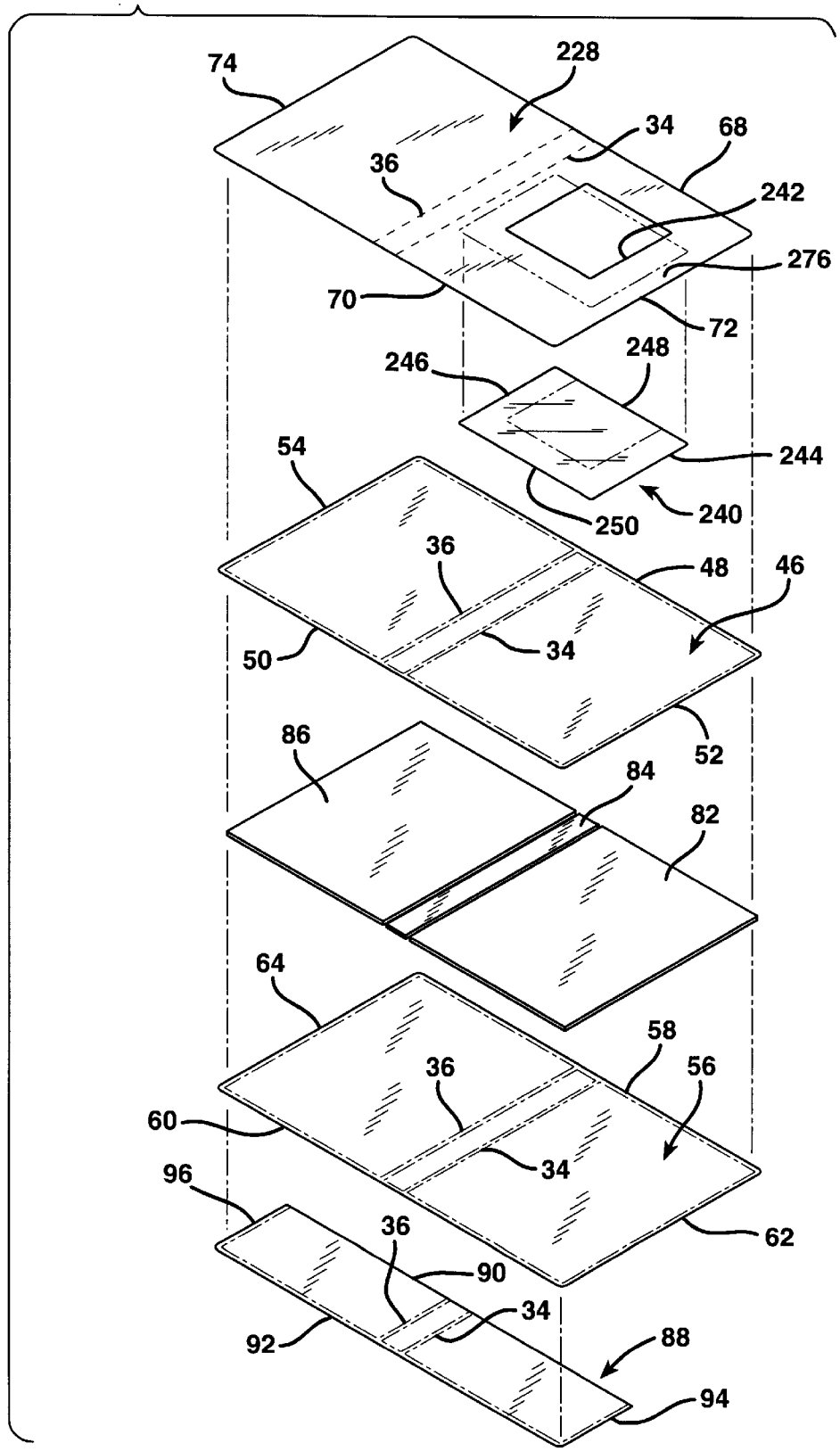
FIG. 7 is an exploded perspective view illustrating the method of manufacturing the document binder of FIG. 6.

FIGS. 6 and 7 illustrate another embodiment of a document binder 200 constructed according to the invention. The document binder 200 employs many of the same components of the document binder 10 depicted in FIGS. 1–3A. Components and elements of the document binder 200 that are found in the document binder 10 bear the same reference numerals.

The document binder 200 differs from the document binder 10 primarily in the construction of the overlay 228, and in the utilization of a fusible title window sheet 240. Like the overlay 28, the overlay 228 is formed of a fusible plastic, such as polypropylene, and has an outer perimeter with dimensions identical to those of the outer cover sheet 46 and the inner cover sheet 56. Unlike the overlay 28, however, the overlay 228 is opaque, rather than transparent. Also, the fabrication of the document binder 200 involves initially cutting a rectangular viewing opening 242 in the overlay 228. As a result, a marginal, rectangular border 276 is defined about the viewing opening 242. The outer perimeter of the rectangular, marginal border 276 is formed by the front cover side edge 72, the top edge 68 and the bottom 70 of the overlay 228, and by the spine demarcation 34 that extends between the top edge 68 and bottom edge 70 parallel to the side edges 72 and 74.

The transparent, rectangular, fusible, title window sheet 240 is formed of clear, transparent, polypropylene plastic and has dimensions greater than those of the rectangular viewing opening 242. That is, the side edges 244 and 246 of the transparent title window sheet 240 are longer than the edges of the viewing opening 242 that are parallel to the front and back cover side edges 72 and 74. Similarly, the top edge 248 and the bottom edge 250 of the title window sheet 240 are wider than the upper and lower edges of the viewing opening 242 that are parallel to the top and bottom edges 68 and 70 of the overlay 228.

In the construction of the document binder 200, the title window sheet 240 is positioned between the opaque overlay 228 and the outer fusible sheet 46 such that a portion of the periphery of the title window sheet 240 around three sides thereof is entrapped between that portion of the overlay 228 adjacent the viewing opening 242. That is, the side edges 244 and 246 and the bottom edge 250 of the title window sheet 240, and the areas of the title window sheet 240 immediately adjacent thereto, are entrapped between the overlay 228 and the outer plastic sheet 46. However, the title window sheet 240 is positioned beneath the overlay 228 such that the top edge 248 of the title window sheet 240 is located about an eighth of an inch below the top edge of the viewing opening 242.

With the title window sheet 240 positioned between the overlay 228 and the outer cover sheet 46 in this manner, the marginal, rectangular border 276 of the overlay 228 is sealed throughout to the underlying portion of the outer cover sheet 46 located immediately therebeneath. Since the title window sheet 240 is also formed of a fusible material, it likewise is sealed to both the overlay 228 and the outer cover sheet 46 along its marginal areas immediately adjacent its edges 244, 246, and 250.

The overlay 228 is sealed to the outer cover sheet 46 and the inner cover sheet 56 throughout its entire perimeter. In addition, the overlay 228 is sealed to the outer cover sheet 46 throughout the rectangular marginal border area 276, including the region between the spine demarcation 34 and the nearest edge of the viewing opening 242, which forms an attachment band adjacent the spine demarcation 34 along which the overlay 228 and outer cover sheet 46 are fused together.

Thereafter, the nonfusible front cover core 82, spine core 84, and back cover core 86 are positioned between the outer sheet 46 and the inner sheet 56 in manner described in conjunction with FIGS. 1–3A. Likewise, the inside pocket sheet 88 is formed and positioned as described in conjunction with those drawing figures.

The entire perimeter of the overlay 228 is congruent to the perimeters of the outer cover sheet 46 and the inner cover sheet 56. The congruent edges of the overlay 228, the outer cover sheet 46, the inner cover sheet 56 and the inside pocket sheet 88 are thereupon sealed together in the same manner previously described. Also, the same structures are likewise fused together along the spine demarcations 34 and 36, likewise in the manner previously described. As in the other embodiments described the flat, nonfusible cover cores 82, 84, and 86 are trapped between the outer sheet 46 and the inner sheet 56, and are isolated from each other by the lines of fusion extending along the spine demarcations 34 and 36.

In the document binder 200, the unsecured, central portion of the upper edge 248 of the title window sheet 240 forms the unsealed mouth of the title sheet pocket 230. A title sheet may be inserted into the pocket 230 through the gap formed between the unsealed portion of the top edge 248 of the title window sheet 240 and the upper edge of the viewing opening 242.

As in the document binder 10, the document binder 200 is formed of an overlay 228 and inner and outer sheet 56 and 46 of plastic material that have perimeters defining sides, all of which are mutually coterminous throughout. All of the outer edges of these structures are fused together to encapsulate the core elements of the binder between the inner and outer sheets of plastic 56 and 46. The overlay 228 has a perimeter defining four edges 68, 70, 72, and 74 all of which are coterminous with and fused to the edges of the perimeters of the inner plastic sheet 56 and the outer plastic sheet 46. The overlay 228 is sealed to the outer plastic sheet 46 throughout a marginal, rectangular border 276 located within the perimeter of the transparent overlay 228.

Modifications of the embodiment of the invention depicted in FIGS. 6 and 7 are also possible. The reason for forming the outer cover sheet 46 from an opaque material rather than a transparent material is because the chipboard core components 82, 84, and 86 are not particularly attractive in appearance, and are therefore concealed for aesthetic reasons. However, if a nonfusible core is employed which is aesthetically pleasing, the embodiment of the invention depicted in FIGS. 6 and 7 can be modified to permit elimination of the title window sheet 240. For example, the unattractive chipboard core can be painted to improve its appearance. The title window sheet 240 may then be eliminated if the outer cover sheet 46 is formed of a transparent material and is initially die cut with a slit that extends transversely across it parallel to its upper edge 48 and spaced longitudinally therefrom the same distance as the upper edge 248 of the title window sheet 240 that is eliminated. This slit can be cut coextensive with the width of the viewing opening 242. Therefore, when the overlay 228 is sealed to the outer cover sheet 46 throughout the marginal rectangular border 276, a title sheet pocket is defined between the central region of the outer cover sheet 46 surrounded by the marginal rectangular border 276 and the front cover core 82. A title sheet can thereupon be inserted into and removed from the title sheet pocket through the transverse slit formed in the transparent outer cover sheet 46 that resides directly atop the front cover core 82 and within the lateral confines of the viewing opening 242 in the overlay 228.

Furthermore, the slit in such a transparent outer cover sheet need not necessarily be formed to coincide with the position of the upper edge 248 of the title window sheet 240. Rather, a slit formed in such a transparent outer cover sheet 46 will provide access to a pocket formed between a transparent outer cover sheet and the front cover core 82 if it is defined within the enclosure of the viewing opening 242 at any location therewithin. For example, such a slit could provide access to the pocket if formed immediately adjacent and parallel to either of the longitudinally-extending sides of the viewing opening 242, or just above and parallel to the lower edge of the viewing opening 242. Other modifications are also possible.

Figure 8:
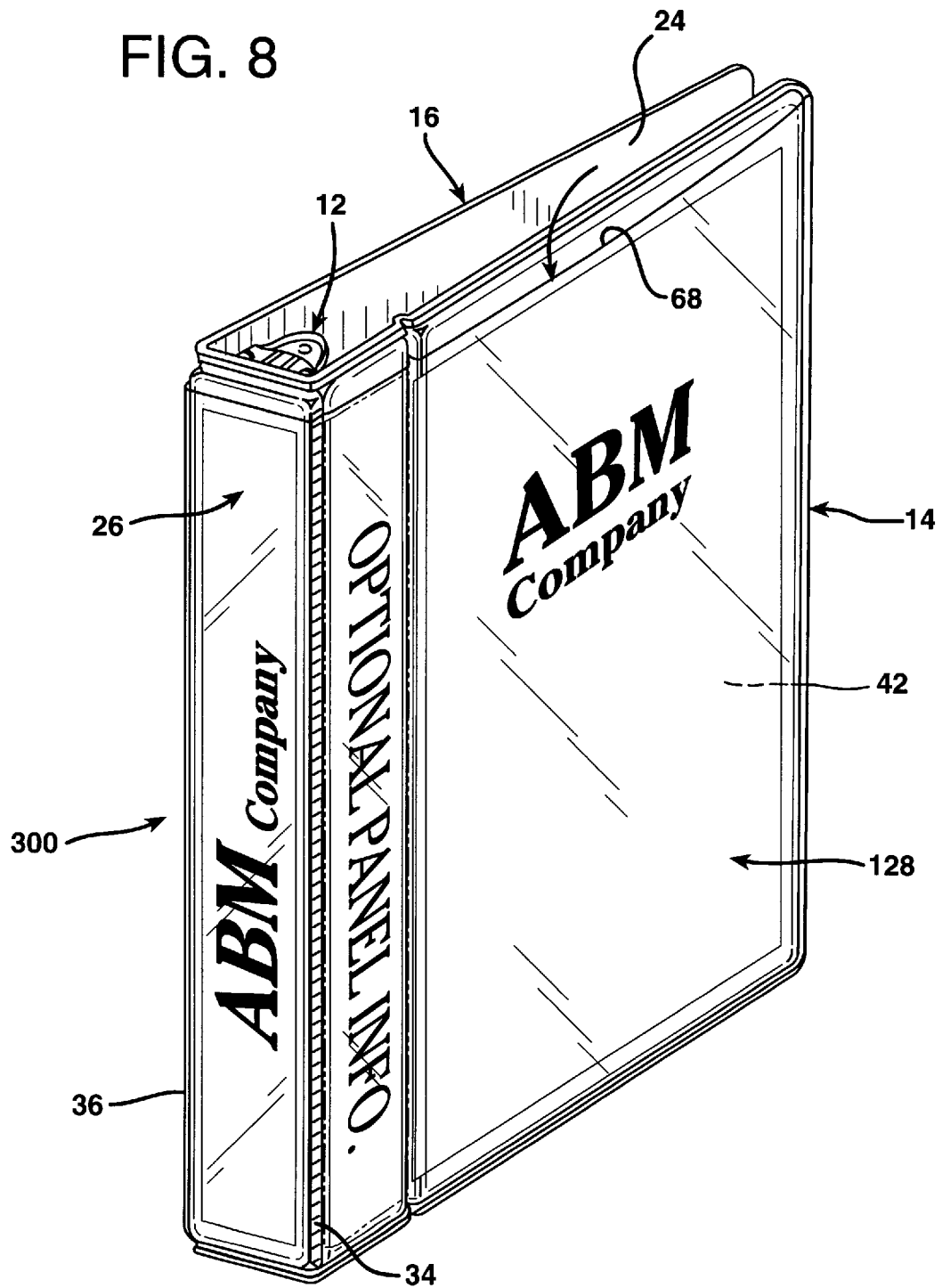
FIG. 8 illustrates a further alternative embodiment of a document binder constructed according to the invention.
Figure 9:
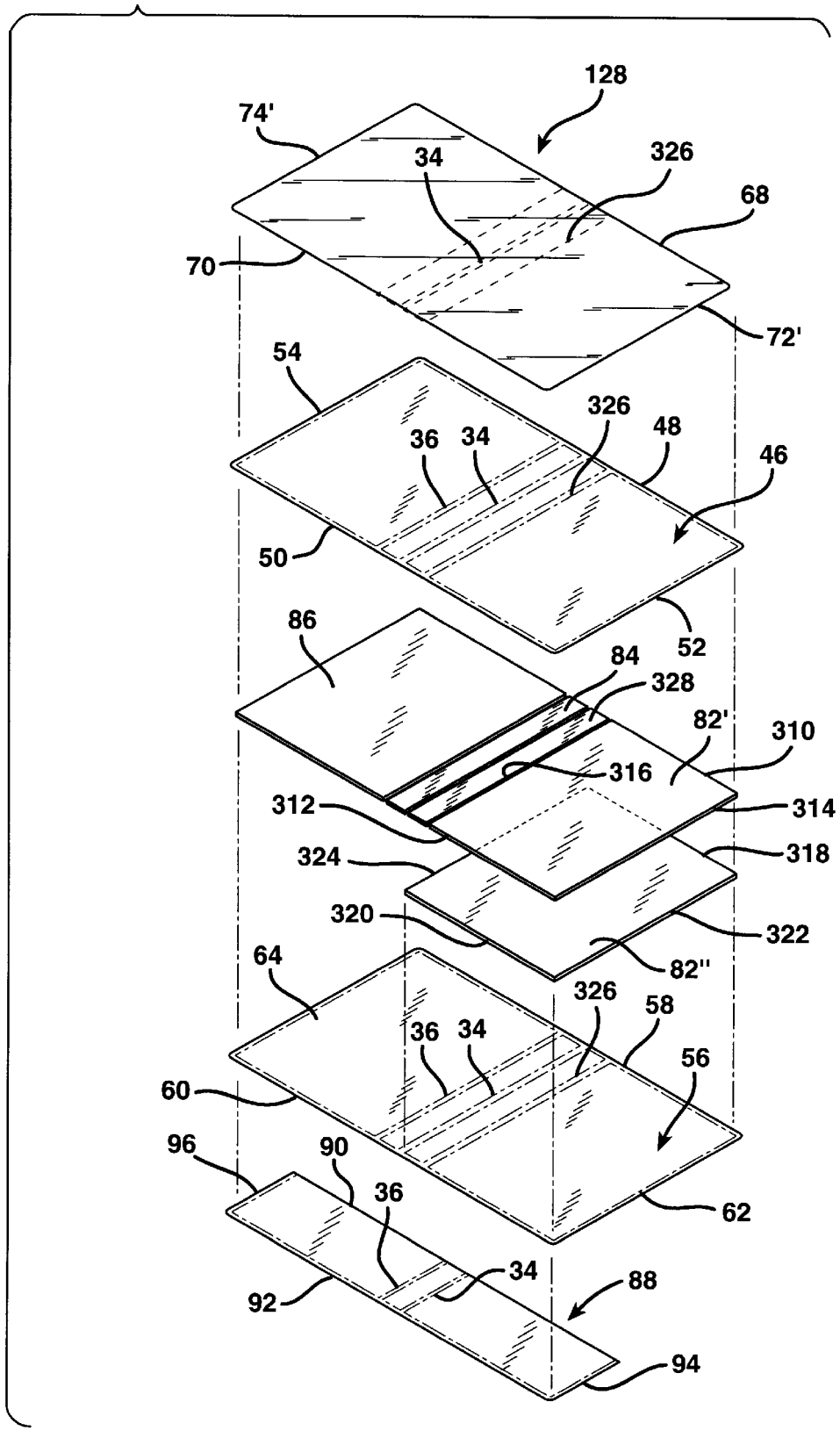
FIG. 9 is an exploded perspective view illustrating the method of manufacturing the document binder of FIG. 8.

FIGS. 8 and 9 illustrate another embodiment of a document binder 300 according to the invention. The document binder 300 is similar in many respects to the document binder 100 depicted in FIGS. 4–5A, and components and elements depicted and described in conjunction with the document binder 100 which are also included in the document binder 300 bear the same reference numbers.

The document binder 300 differs from the document binder 100 primarily in its inner core structure. As in the other embodiments of the invention, the core of the document binder 300 is comprised of flat, nonfusible, chipboard core components. The nonfusible spine cover core 84 and back cover core 86 are identical to those utilized in the other embodiments. The nonfusible front cover core 82', however, is narrower than the core 82 employed in the other embodiments. Specifically, the nonfusible core 82' preferably has a width of only about eight and three-quarters inches.

In addition to the nonfusible core elements, the document binder 300 utilizes a flat, stiff, fusible core panel 82" that underlies the nonfusible core 82'. The fusible core panel 82" is disposed between the nonfusible core 82' and the inner fusible plastic sheet 56 prior to any fusion step. The fusible core panel 82" is greater in width than the nonfusible core 82' and extends all the way from just within the front cover side edges 52 and 62 of the outer cover sheet 46 and inner cover sheet 56 to the spine demarcation 34. The fusible core panel 82" is preferably formed of a sheet of polypropylene, vinyl, or fusible material compatible with the materials of which the inner and outer cover sheets 46 and 56 are formed.

The nonfusible core panel 82' has a top edge 310, a bottom edge 312, a front cover outside edge 314, and a front cover inside edge 316. The wider, polypropylene, fusible core panel 82" has a top edge 318, a bottom edge 320, a front cover outside edge 322, and a front cover inside edge 324. In positioning the core components, the fusible core panel 82" is positioned beneath the nonfusible core panel 82' with the front cover side edges 314 and 322 congruent and coterminous to each other. The top and bottom edges 310 and 312 of the nonfusible core panel 82' are congruent to but shorter than the top and bottom edges 318 and 320 of the fusible core panel 82". As a consequence, there is a gap between the inside edge 316 of the nonfusible core panel 82' and the inside edge 324 of the fusible core panel 82".

As a result, when all of the layers of the document binder 300 are assembled together, the outer fusible plastic cover sheet 46 resides in direct contact with the fusible core panel 82" at a band of attachment indicated at 326. This band of attachment lies just beyond the inside edge 316 of the nonfusible core 82'. Consequently, the overlay 128, the outer fusible sheet 46, the fusible core panel 82" and the inner fusible sheet 56 and the inside pocket sheet 88 are all fused together along the band of attachment 326.

Since the inner fusible core 82" is wider than the nonfusible core panel 82', it extends into registration with the band of attachment 326 throughout its length. During the fusing process, the band of attachment 326 is fused to the fusible core 82" while concurrently fusing the overlay 128, the outer fusible sheet 46, the inner fusible sheet 56, and the fusible inside pocket sheet 88 together, all about the mutually congruent edges thereof, and also along the spine demarcations 34 and 36.

The fabrication of the document binder 300 is advantageous in that the fusion together of all elements can be performed with but a single fusion step. However, the document binder 300 does require an additional component, namely the fusible core panel 82".

While the document binder 300 can be constructed with a gap left between the nonfusible core panel 82' and the nonfusible spine core 84, for aesthetic reasons it may be advisable to utilize a nonfusible margin insert 328 between the band of attachment 326 and the spine demarcation 34. The margin insert 328 may be formed as a narrow, flat, rectangular strip of chipboard interposed between the outer, fusible, rectangular cover sheet 46 and the fusible core panel 82". The margin insert 328 is laterally separated from both the nonfusible core panel 82' and from the spine panel 84 to permit fusion on either side thereof at the band of attachment 326 and at the spine demarcation 34. The margin insert 328 is positioned on an opposite side of the band of attachment 326 from the nonfusible core panel 82'. During the single step of fusion, the overlay 128, the outer fusible sheet 46, the fusible core 82", the inner fusible sheet 56, and the inside pocket sheet 88 are fused at the band of attachment 326 between the nonfusible core 82' and the margin insert 328.

As in the document binder 100, the document binder 300 is formed with more than a single pocket. Specifically, the document binder 300 includes a front cover pocket 30", a spine pocket 41, and a back cover pocket 130, illustrated in FIG. 9A. In addition, a narrow margin pocket 330 may be formed between the overlay 128 and the outer cover sheet 46. This margin pocket is marginally bounded by the spine demarcation 34 and the band of attachment 326. Since access is provided to all of the pockets in the document binder 300 by the unsealed portions of the top edge 68 of the overlay 128, a title sheet 42 may be inserted into the front cover pocket. An optional information strip may be inserted into the pocket 330. A spine title strip 40 may be inserted into the spine pocket 41. Useful tables and charts, or other flat materials may be inserted into the back pocket 130.

Undoubtedly, numerous variations and modifications of the invention will become readily apparent to those familiar with office supply products. For example, in addition to the stiff core members provided, it is possible to additionally provide padding between the core components and the outer fusible plastic sheet. Also, for aesthetic reasons it is sometimes advisable to create patterns of fusion, such as the waffle iron grid pattern of FIGS. 4 and 5B, or other patterns in fusing the overlay to the outer cover sheet at the attachment strips and in the marginal, rectangular border areas. Accordingly, the scope of the invention should not be construed as limited to the specific embodiments of the invention depicted and described and the techniques for practice of the method thereof.

I claim:

1. A document binder comprising front and back covers both having a length and width and inner and outer faces, wherein said front and back covers both have perimeters of rectangular configuration, and wherein at least said front cover is comprised of an outer, fusible, rectangular sheet of plastic material at said outer face, and an inner, fusible, rectangular sheet of plastic material at said inner face, and a flat stiff, nonfusible core extending unbroken across the entire width and length of said front cover, and wherein said front cover has a width of at least about nine and three-quarters inches, and a spine having inner and outer faces interposed between and hinged lengthwise in articulated fashion to both said front and back covers wherein said spine has a perimeter shaped as a narrow, elongated rectangular strip, narrower than said front and back covers, a fusible, plastic, rectangular overlay secured to at least a portion of said perimeter of said front cover and fused to said outer sheet of plastic material lengthwise along a band of attachment parallel and proximate to said spine, and extending across the entire width of said outer face of said front cover to define a title sheet pocket with an unsealed mouth, said title sheet pocket having a width of no greater than about nine inches, and said inner and outer sheets of plastic material have perimeters defining edges all of which are mutually congruent and coterminous throughout and are fused together to encapsulate said core between said inner and outer sheets of plastic material and said overlay is transparent and has a perimeter defining edges, at least some of which are congruent with and are fused to at least some of said edges of said perimeters of said inner and outer sheets, and a title sheet located within said title sheet pocket and laterally confined snugly therewithin and visible through said overlay.

2. A document binder according to claim 1 wherein all of said edges of said perimeter of said transparent overlay are congruent and coterminous with and fused to said edges of said perimeters of said inner and outer plastic sheets, and said transparent overlay is sealed to said outer plastic sheet throughout a marginal rectangular border located within the aforesaid perimeters of said transparent overlay and said outer plastic sheet, thereby defining said title sheet pocket as an unsealed area between said transparent overlay and said outer plastic sheet, and a slit is formed in said transparent overlay across said title sheet pocket to define said unsealed mouth thereof.

3. A document binder according to claim 1 wherein said transparent, rectangular overlay has four edges, three of which are congruent with and fused to edges of said inner and outer sheets and the fourth of which is unsealed and forms said unsealed mouth of said title sheet pocket.

4. A document binder according to claim 3 wherein said overlay is about one eighth of an inch shorter than said inner and outer sheets and has a top edge which forms said unsealed mouth of said title sheet pocket.

5. A document binder according to claim 1 further comprising a flat, stiff, fusible core underlying said nonfusible core and said fusible core is greater in width than said nonfusible core and said fusible core is disposed between said nonfusible core and said inner fusible sheet of plastic material, and said outer fusible sheet of plastic material contacts said fusible core at said band of attachment, and said transparent overlay, said outer fusible sheet, said fusible core, and said inner fusible sheet are all fused together along said band of attachment.

6. A document binder according to claim 5 further comprising a margin insert formed as a narrow, flat, rectangular strip of nonfusible material interposed between said outer fusible rectangular sheet and said fusible core and laterally separated from both said nonfusible core and said spine.

7. A document binder according to claim 1 further comprising a rectangular, fusible, inside pocket sheet having an area smaller than that of said inner, fusible, rectangular sheet and fused to said inner, fusible, rectangular sheet to form at least an inside cover pocket at the inside of said front cover.

8. A document binder according to claim 1 wherein said overlay has a perimeter defining four edges all of which are congruent and coterminous with and fused to said edges of said perimeters of said inner and outer plastic sheets, and said overlay is sealed to said outer plastic sheet throughout a marginal rectangular border located within the aforesaid perimeters of said transparent overlay and said outer plastic sheet, said marginal, rectangular border defining a viewing opening through said overlay, and further comprising a transparent window sheet interposed between said overlay and said outer plastic sheet to form said title sheet pocket, said window sheet having a periphery, a portion of which is secured to said overlay adjacent said viewing opening and another portion of which is unsecured to form said unsealed mouth of said title sheet pocket.

9. A method of manufacturing a document binder comprising:

forming a fusible, rectangular overlay, an outer, fusible, rectangular sheet of material, and an inner, fusible, rectangular sheet of material all with mutually parallel top edges, bottom edges, and laterally spaced front and back cover side edges such that the lengths of said outer and inner fusible sheets of material are the same and the widths of said outer and inner sheets of material are the same, and such that the width of said overlay is the same as that of said inner and outer fusible sheets of material and the length of said overlay is no greater than that of said inner and outer fusible sheets of material, positioning said rectangular overlay atop said outer, fusible, rectangular sheet of material so that at least said side edges and said bottom edge of said overlay are respectively congruent to said side edges and said bottom edge of said outer sheet of material, fusing said overlay to said outer rectangular sheet along a band of attachment that is parallel to said side edges and is laterally spaced from said front cover side edges of said overlay and said outer sheet, positioning said outer, fusible sheet and said overlay atop said inner fusible sheet with said outer, fusible sheet in congruent relationship relative to said inner, fusible sheet and with said overlay in at least partially congruent relationship relative thereto, positioning flat, nonfusible front and back cover cores and a spine cover core between said inner and outer fusible sheets such that said nonfusible front cover core is disposed laterally between said front cover side edges wherein said front cover core has a width of at least nine and three-quarter inches, said spine core is located laterally adjacent to said front cover core in spaced separation therefrom, and said back cover core is located laterally adjacent to said spine core in spaced separation therefrom, and all of said cores reside within an area bounded by said top and bottom edges and said front and back cover side edges of said inner and outer fusible sheets, and fusing said fusible overlay and said outer and inner fusible sheets together at their edges which are mutually congruent and on both sides of said spine core so as to encapsulate said cores between said outer and inner sheets and so as to form a document binder having front and back covers with a spine located therebetween and with a title sheet pocket on said front cover, said title sheet pocket having an unsealed mouth between said linear band of attachment and said front cover side edges of said overlay and said outer sheet and said title sheet pocket is no greater than about nine inches in width.

10. A method according to claim 9 wherein said overlay is transparent and is shorter in height that said outer and inner fusible sheets and said top edge of said overlay is not sealed to either of said fusible sheets and forms said unsealed mouth of said title sheet pocket.

11. A method according to claim 9 wherein said overlay is transparent and has a length equal to that of said outer and inner fusible sheets and prior to positioning said cores as aforesaid said overlay is fused to said outer sheet throughout a marginal, rectangular border located within said top, bottom, and side edges thereof, thereby defining said title sheet pocket as an unsealed area between said transparent overlay and said outer sheet surrounded by said marginal, rectangular border and further comprising cutting a slit in said transparent overlay within said unsealed area thereof surrounded by said rectangular border prior to fusing said overlay to said outer fusible sheet.

12. A method according to claim 9 wherein said overlay is opaque and has a length equal to that of said outer and inner fusible sheets and further comprising initially cutting a rectangular viewing opening in said overlay.

13. A method according to claim 12 further comprising providing a transparent, rectangular fusible title window sheet having dimensions greater than those of said rectangular viewing opening, positioning said window sheet between said overlay and said outer fusible sheet such that a portion of the periphery of said title window sheet around three sides thereof is entrapped between that portion of said overlay adjacent said viewing opening, and fusing said entrapped portion of said periphery of said title window sheet to both said overlay and said outer fusible sheet while concurrently fusing said overlay to said outer fusible sheet along said band of attachment.

14. A method according to claim 9 further comprising positioning a flat, stiff, fusible core wider than said nonfusible front cover core between said nonfusible front cover core and said inner fusible sheet, whereby said fusible core extends into registration with said band of attachment throughout its length, and fusing said fusible overlay and said outer and inner fusible sheets to said fusible core at said band of attachment while concurrently fusing said fusible overlay and said outer and inner fusible sheets together.

15. A method according to claim 14 further comprising positioning a margin insert formed as a narrow, flat, rectangular strip of nonfusible material between said outer fusible sheet and said fusible core in lateral separation from said nonfusible core and on an opposite side of said band of attachment therefrom, and concurrently fusing together said outer fusible sheet, said fusible core, and said inner fusible sheet at said band of attachment between said nonfusible core.

16. A method according to claim 9 further comprising positioning a rectangular, fusible, inside pocket sheet having four edges and an area smaller than that of said inner, fusible, rectangular sheet such that three edges of said inside pocket sheet are congruent with three corresponding edges of said inner fusible sheet, and concurrently fusing all mutually congruent edges of said inside pocket sheet, said overlay, and said inner and outer fusible sheets together.

17. A method of manufacturing a document binder comprising:

forming inner and outer fusible rectangular cover sheets with top edges, bottom edges, front cover side edges, and back cover side edges so that the lengths of the side edges of each of said cover sheets are equal to each other and so that the widths of said top and bottom edges of each of said cover sheets are equal to each other, forming a rectangular, fusible overlay with a top edge, a bottom edge, a front cover edge, and a back cover edge so that said top and bottom edges of said overlay have the same width as said top and bottom edges of said cover sheets and so that said side edges of said overlay have a length no greater than the length of said side edges of said cover sheets, positioning said overlay atop said outer cover sheet so that at least said bottom edges and said side edges thereof are aligned in mutually congruent relationship, fusing said overlay to said outer cover sheet lengthwise along a band of attachment located between and parallel to said side edges thereof, forming flat, nonfusible, rectangular front and back cover cores and a narrow, nonfusible, rectangular spine cover core in sizes such that the lengths of each of said nonfusible cores are equal to each other and are less than the lengths of said fusible cover sheets and the aggregate sum of the widths of said nonfusible cover cores is less than the width of said fusible cover sheets and said front cover core has a width of at least about nine and three-quarter inches, positioning said nonfusible cores side by side in spaced separation from each other atop said inner cover sheet with said nonfusible spine core located between said front and back cover cores so that all of said nonfusible cores reside within the perimeter of said inner cover sheet, positioning said outer cover sheet with said overlay fused thereto atop said nonfusible cores and said inner cover sheet so that all of said edges of said inner and outer cover sheets are mutually congruent to each other and so that at least said bottom and side edges of said overlay are congruent to said bottom and side edges of said cover sheets, and fusing together said overlay and said inner and outer cover sheets about all congruent edges thereof and also lengthwise on both sides of said nonfusible spine core, thereby encapsulating said nonfusible cores between said inner and outer cover sheets in isolation from each other.

18. A method according to claim 17 further comprising forming a fusible, rectangular inside pocket sheet with a top edge, a bottom edge, a front cover edge, and a back cover edge and with a width equal to the width of said covers and a length shorter than the length of said covers, positioning said inside pocket sheet beneath said inside cover sheet so that said bottom edge, said front cover side edge and said back cover side edge of said inside pocket sheet reside directly beneath said bottom edge, said front cover side edge and said back cover side edge, respectively, of said inner cover sheet, and fusing said bottom edge and said side edges of said inside pocket sheet to said bottom edge and side edges of said inner cover sheet while concurrently fusing said overlay and said cover sheets together.

* * * * *